United States Patent [19]

Naccarato et al.

[11] Patent Number: 4,547,100
[45] Date of Patent: Oct. 15, 1985

[54] ADJUSTABLE MILLING CUTTER

[75] Inventors: Peter D. Naccarato; Robert W. Johnson, both of Windsor, Canada

[73] Assignee: The Valeron Corporation, Troy, Mich.

[21] Appl. No.: 536,613

[22] Filed: Sep. 28, 1983

[51] Int. Cl.⁴ .............................................. B26D 1/12
[52] U.S. Cl. ......................................... 407/39; 407/46
[58] Field of Search ...................... 407/39, 38, 37, 36, 407/46, 9, 8; 408/DIG. 714, 156

[56] References Cited

U.S. PATENT DOCUMENTS

| 2,104,604 | 1/1938 | Bartek | 407/38 |
|---|---|---|---|
| 2,584,449 | 2/1952 | Hoglund | 407/39 |
| 3,270,396 | 9/1966 | Williams | 407/39 |
| 3,282,133 | 11/1966 | Dickinson et al. | |
| 3,516,134 | 6/1970 | Heuser | 407/37 |
| 3,675,290 | 7/1972 | Mayer | |
| 3,802,043 | 4/1974 | Garih | |
| 3,834,829 | 9/1974 | Munro | |
| 4,040,156 | 8/1977 | Tack | |

FOREIGN PATENT DOCUMENTS

| 0048833 | 4/1982 | European Pat. Off. | 407/38 |
|---|---|---|---|
| 1812706 | 7/1969 | Fed. Rep. of Germany | 408/156 |
| 2615913 | 10/1977 | Fed. Rep. of Germany | 407/36 |
| 1084975 | 9/1967 | United Kingdom | 407/36 |
| 0596381 | 3/1978 | U.S.S.R. | 407/9 |

Primary Examiner—Francis S. Husar
Assistant Examiner—William E. Terrell
Attorney, Agent, or Firm—Charles A. Doktycz

[57] ABSTRACT

A cutting tool with precisely adjustable disposable cutting inserts. In the preferred embodiment of a face milling cutter, the tool utilizes insert holding cartridges mounted in cavities spaced about the periphery of the cutter body, each cartridge including an insert mounting pocket for presenting each insert such that its cutting portion extends beyond a face of the cutter body. The insert mounting portion of each cartridge is rendered flexible by a slot in the cartridge body. A wedge mechanism adjacent each cartridge causes the cartridge to bend in a manner such that the insert cutting tip will traverse an arcuate path thereby finally and precisely varying the extent to which the cutting portion of the insert extends beyond the cutter body face.

4 Claims, 3 Drawing Figures

ADJUSTABLE MILLING CUTTER

BACKGROUND OF THE INVENTION

1. Field of the Invention

The invention relates generally to chip forming cutting tools. More particularly the invention concerns face milling cutters having adjustment mechanisms for finely controlling the axial extent of a cutting bit or insert beyond the cutting face of the mill, i.e. face runout.

2. Description of the Prior Art

Cutting tools with adjustable cutting element positions are known wherein the cutting elements or inserts are adjusted by providing a flexible portion of the toolholder body or of an insert holding cartridge. Also in this class of adjustable cutting tools are those using camming elements to deform an insert holding blade elastically so as to alter the projection of the cutting tip beyond a predetermined reference plane. Examples of this known class of cutting tools are set forth in the following U.S. Pat. Nos. 3,282,133—Dickinson et al.; 3,675,290—Mayer, July 11, 1972; 3,802,043—Garih, Apr. 9, 1974; 3,834,829—Munro, Sept. 10, 1974; 4,040,156—Tack, Aug. 9, 1977.

Use of polycrystalline diamond tipped cutting inserts has created milling applications utilizing relative high surface speeds. To generate acceptably smooth surfaces at these higher speeds, each cutting portion or tip of each insert must be very precisely positioned relative to the other inserts of the milling cutter.

The Mayer and Tack patents dislcose adjusting concepts which limit the usable shape of the cutting inserts or the lead angle at which they can be mounted, since the adjustment is effected by a flexible tongue riding along a sloping surface of the insert to impart linear sliding motion of the insert along a wall of its associated mounting pocket. Such friction generating insert motion has the further disadvantage of not offering smoothly attainable, ultra fine adjustment accuracy required in higher speed milling applications.

The Mayer, Garih and Tack patents disclose concepts suffering from the further disadvantage that bi-directional adjustment of the cutting tip is not attainable with the adjustment actuating means disclosed. Even unidirectional adjustment utilizing the teachings of Mayer and Tack is not possible without first loosening the insert retention apparatus. Similarly, the Munro boring tool inserts cannot be bi-directionally adjusted without first loosening a cone point screw engaging the insert to be moved.

Dickinson et al. teaches adjustable boring tools requiring sawcuts or slots formed in the tool holder body itself and is therefore not applicable to a multi-insert cutting tool where each insert must be independently adjustable. This approach also limits the size and bulk of the tool body and, since the adjusting actuator directly engages one or both walls of the slot, limits the physical location of the actuating element and slot with respect to the insert to be adjusted.

A need has therefore been shown, especially in high speed milling applications, for a cutting tool with very finely adjustable cutting inserts in which the cutting portion of each insert can be minutely altered in two directions with respect to a reference surface of the cutting tool body.

SUMMARY OF THE INVENTION

It is therefore an object of the invention to provide a cutting tool with disposable cutting elements or inserts having apparatus for effecting extremely minute adjustment of the cutting portions of the inserts in either of two directions with respect to a predetermined reference surface of the tool.

In a preferred embodiment, a face milling cutter includes insert holding cartridges mounted in cavities spaced about the periphery of the cutter body, each cartridge including an insert mounting pocket for presenting each insert such that its cutting portion extends beyond a face of the cutter body and a sawcut or slot in the cartridge body which imparts flexibility to that portion of the cartridge containing the insert mounting pocket. A wedging mechanism is mounted in the cutter body adjacent each cavity such that its wedging surface will, upon actuation, cause the flexible portion of the cartridge to bend about a fulcrum point in the cartridge body material near the inner terminus of the slot. In this manner, the cutting portion of an insert mounted in the cartridge mounting pocket will, upon actuation of the wedging mechanism, traverse an arcuate path varying the extent to which the cutting portion extends beyond the cutter body face. Provision is also made for coarse adjustments of the position of the insert cutting portion both normal and parallel to the cutter body face.

BRIEF DESCRIPTION OF THE DRAWINGS

The objects and features of the invention will become apparent from a reading of a detailed description of a preferred embodiment, taken in conjunction with the drawing in which.

DETAILED DESCRIPTION

Figure 1:
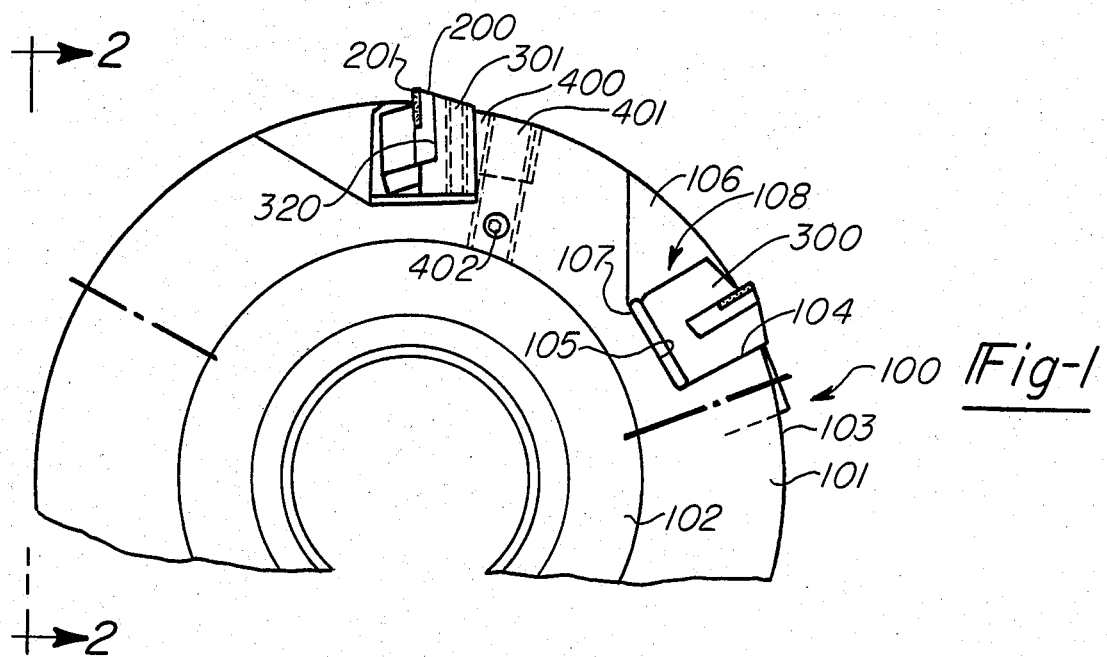
FIG. 1 is an axial plan view of a cutting tool designed in accordance with the principles of the invention.
Figure 2:
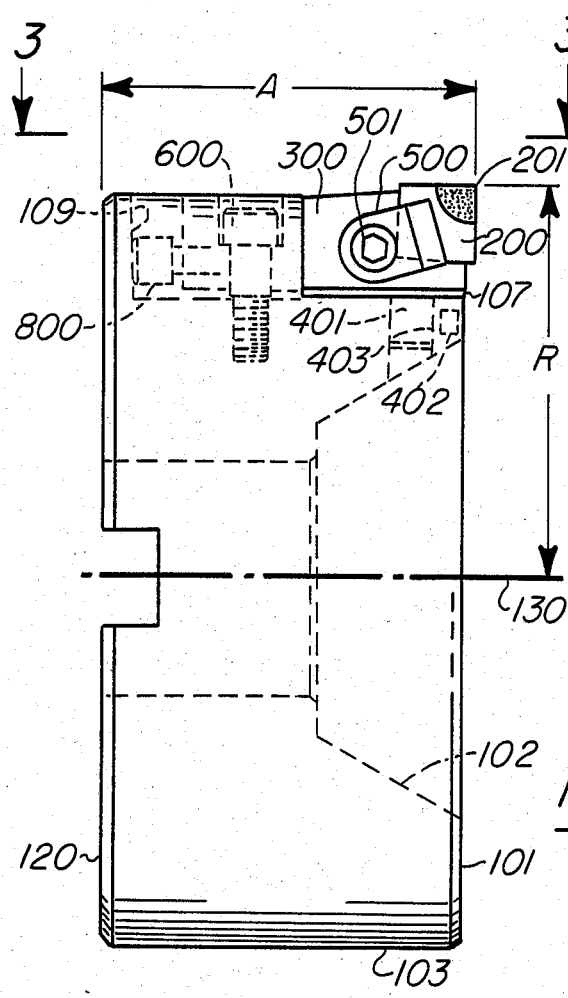
FIG. 2 is a plan view taken along line 2—2 of FIG. 1.
Figure 3:
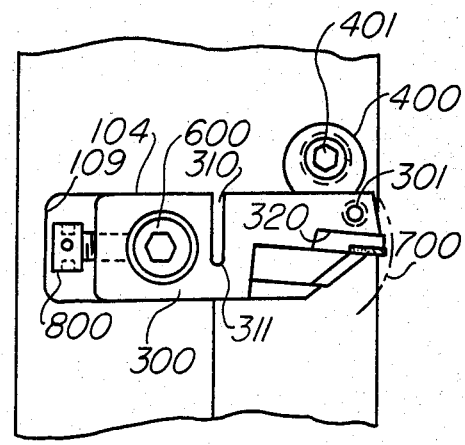
FIG. 3 is a partial plan view taken along line 3—3 of FIG. 2.

With reference to FIGS. 1–3, it should be noted that the same components are designated by the same reference numerals in the various plan views.

Shell style end milling cutter 100 has a substantially cylindrical body 103 including cutter body face 101 which is substantially parallel to the plane of cutter body rotation. Body mounting surface 102 is shaped for mating engagement with an appropriate conventional shell mill mounting adaptor.

Spaced about the longitudinal axis 130 of cutter body 103 are a series of equiangularly spaced cavities 108, each extending axially from a bottom surface 109 and opening at cutter body face 101, and each having first and second side surfaces 104 and 105, respectively. Preceding and intersecting each cavity 108 in the direction of cutter body rotation is a suitably formed chip gullet 106.

A cartridge 300 is located in each cavity 108. Each adjustable cartridge 300 has a cutting insert mounting pocket 320 disposed in its forward end such that a cutting insert 200 placed therein will have its cutting portion 201 extending axially beyond cutter body face 101 to an extent adjustable by apparatus to be described below. Each cartridge 300 is held in its respective cavity 108 via a screw 600 engaging a suitably threaded hole in cutter body 103. A top clamp 500 actuated by clamp screw 501 retains each cutting insert 200 in its mounting cavity or pocket 320. It will be readily apparent to those skilled in the art that alternative approaches to insert retention can be accomodated in cutters of this invention, for example, screw down or lock pin arrangements conventionally used with inserts having mounting holes formed through the insert body.

Each cartridge 300 additionally includes an elongate slot or sawcut 310 remote from the insert mounting cavity 320, opening at a side surface of the cartridge 300 abutting first side surface 104 of cavity 108, and positioned between the end of cartridge 300 facing bottom cavity surface 109 and the front end of cartridge 300 including pocket or cavity 320. With the slot 310 so positioned, the front portion of the cartridge 300, including mounting cavity 320, becomes slightly flexible about a fulcrum point 311 located in the vicinity of the closed end terminus of slot 310. Hence an insert in mounting cavity 320 will, on flexing motion of the cartridge, have its cutting point or portion 201 traverse an arc 700 in a plane substantially parallel to the cutter body axis, thereby bi-directionally varying the extent of dimension A (FIG. 2) running from a rear face 120 of body 103 to cutting point 201—i.e. varying the axially extent of the cutting point 201 beyond cutter body face 101.

Cutting point adjusting motion is imparted to flexible cartridge 300 via wedge 400 located in the cutter body adjacent an intersecting first side surface 104 of each cartridge cavity 108, each wedge having a surface abutting a cartridge side surface between the open end of the slot 310 and the forward end of cartridge 300 which includes mounting pocket 320. Wedge 400 is actuated via wedge screw 401 threadingly engaging an appropriately tapped hole in cutter body 103. Extremely fine adjustment is possible because smooth arcuate movement is imparted to the entire insert mounting pocket 320.

The desired position of wedge 400 is held during use of the milling cutter via lock screw 402 which threadingly engages a suitably tapped hole in cutter body 103 transverse to and intersecting the tapped hole which receives wedge screw 401. Between the end of lock screw 402 and the threads of wedge screw 401 is placed a shoe 403 made of a material which will lockingly bear upon the threads of screw 401 without damage thereto. One such material found suitable for shoe 403 is brass.

Associated with each cartridge 300 is a coarse axial locator screw 800 threaded into the bottom end of cartridge 300 and having a suitably shaped head in abutting engagement with bottom cavity surface 109. As will be apparent from FIG. 2, the extent to which screw 800 is advanced into cartridge body 300 will determine the distance from the bottom surface of cartridge 300 to bottom cavity surface 109, therefore determining the initial coarse axial setting A of tool point 201.

Additionally associated with each cartridge 300 is a coarse radial locator screw 301 threadingly engaging a suitably tapped hole in cartridge body 300 and having an inner end bearing against a bearing surface associated with second cavity side surface 105. Preferably, the cavity bearing surface comprises a separate sizing plate 107 which can be accurately ground to size and then screw mounted to side surface 105. The extent to which screw 301 is advanced in cartridge 300 will determine the radial distance R (FIG. 2) of cutting tip 201 from the cutter body axis 130.

The cutting point 201 of each insert 200 is finely adjustable with the above described apparatus by performing the following sequence. First, cartridge 300 is loosely coupled to its cavity 108 via mounting screw 600. Screw 600 and its receiving tapped hole in body 103 are designed to have sufficient looseness or play to allow the coarse adjusting steps which follow. Next, dimension A is coarsely set via adjusting screw 800. At this point, cartridge 300 is firmly attached to its cavity 108 by tightening down mounting screw 600. Next, dimension R is adjusted via adjusting screw 301. Next, the axial dimension A is "fine-tuned" via wedge 400 and wedge screw 401. Finally, the precision axial adjustment of dimension A is locked in via the combination of a tightened lock screw 402 pressing brass shoe 403 against the threads of wedge screw 401.

The fine adjustment concept of this invention finds particular utility in applications using polycrystalline diamond tipped cutting inserts. The shaded diamond portion of each insert in this embodiment is designated 201, while the remainder of the insert 200 is typically comprised of a suitable cemented carbide. The relatively high surface speeds used with such inserts in face milling applications require the fine axial adjustment of the insert cutting tips provided by this invention in order to achieve acceptable surface finishes on the workpiece being milled.

The coarse adjustments made with the above apparatus have a resolution on the order of one one-thousandth of an inch. It has been determined in testing adjusting apparatus built in accordance with the principles of the invention that the wedge-flexible cartridge approach to more finely adjusting axial location of cutting points yields adjustability on the order of one ten-thousandth (0.0001) inches for each quarter turn of the wedge screw. This yields a practically obtainable manually set resolution on the order of one-half of one ten-thousandth of an inch—i.e. 0.00005 inches, thereby enabling superior surface finishes to be obtained using face milling cutters designed in accordance with the invention. Ranges of adjustability on the order of plus or minus one thousandth of an inch have been achieved using this flexible cartridge concept. The range is determined principally by the length of slot 310.

What is claimed is:

1. A toolholder for at least one replaceable cutting element, each cutting element having at least one cutting portion, the toolholder comprising:
   a body having at least one cavity which opens at a first and a second surface of the body, the cavity including a bottom surface substantially parallel to said first body surface and a first side surface substantially normal to said bottom surface and projecting to said first and second body surfaces;
   cutting element holding means positioned in the cavity and abutting said first side cavity surface, the holding means having a cutting element mounting pocket positioned for receipt of the cutting element such that the cutting portion projects beyond said first body surface, means retaining the cutting element in the mounting pocket, and a slot which opens at a surface of the cutting element holding means adjacent said cavity first side surface remote from the mounting pocket and positioned so as to define a flexible portion of the holding means including the mounting pocket; and
   wedge means positioned in the toolholder body adjacent said cavity first side surface, having a wedging surface abutting the flexible portion of the holding means, operative to move the flexible portion about a fulcrum point near an inner terminus of the slot such that the cutting portion of a cutting element placed in the mounting pocket will move along an arcuate path in a plane transverse to that of said first body surface.

2. The toolholder of claim 1 further comprising:

first coarse adjustment means coupled between the bottom cavity surface and the cutting element holding means, operative to alter the distance between the bottom cavity surface and the cutting element holding means.

3. The toolholder of claim 2 further comprising:

second coarse adjustment means coupled between the side surface of the cavity and the cutting element holding means, operative to alter the distance between the side cavity surface and the cutting element holding means.

4. The toolholder of claim 1 wherein the wedging surface abuts the flexible portion at a location in the cavity side surface between the slot and the mounting pocket.

* * * * *